United States Patent
Hsu

(10) Patent No.: US 8,864,144 B2
(45) Date of Patent: Oct. 21, 2014

(54) TOOL CONNECTING ROD

(75) Inventor: Chung-Liang Hsu, Taichung (TW)

(73) Assignee: Chung Taan Industrial Co., Ltd., Taichung (TW)

( * ) Notice: Subject to any disclaimer, the term of this patent is extended or adjusted under 35 U.S.C. 154(b) by 408 days.

(21) Appl. No.: 13/439,143

(22) Filed: Apr. 4, 2012

(65) Prior Publication Data

US 2012/0267865 A1   Oct. 25, 2012

(30) Foreign Application Priority Data

Apr. 19, 2011   (TW) .............................. 100113491 A

(51) Int. Cl.
  *B23B 31/117*   (2006.01)
  *B25B 23/00*   (2006.01)
  *B23B 31/00*   (2006.01)
  *B23B 31/28*   (2006.01)

(52) U.S. Cl.
  CPC ......... *B25B 23/0035* (2013.01); *B23B 31/1173* (2013.01); *B23B 2231/0284* (2013.01); *B23B 31/003* (2013.01); *B23B 31/28* (2013.01); *Y10S 279/904* (2013.01)
  USPC ............. 279/50; 279/128; 279/137; 279/143; 279/155; 279/904; 81/438

(58) Field of Classification Search
  CPC .. B32B 31/1173; B32B 31/003; B32B 31/28; B32B 2231/0284
  USPC .......... 279/50, 128, 137, 143, 155, 904, 23.1, 279/46.8, 82; 81/438, 177.85
  See application file for complete search history.

(56) References Cited

U.S. PATENT DOCUMENTS

| | | | | |
|---|---|---|---|---|
| 2,138,012 A | * | 11/1938 | Perr ................................ | 279/50 |
| 2,396,771 A | * | 3/1946 | Brinson, Sr. .................. | 401/244 |
| 2,769,643 A | * | 11/1956 | Denzler .......................... | 279/50 |
| 4,692,073 A | * | 9/1987 | Martindell ................ | 408/239 A |
| 4,787,278 A | * | 11/1988 | Bononi .......................... | 81/438 |
| 2004/0262856 A1 | * | 12/2004 | Cantlon ......................... | 279/22 |
| 2008/0217870 A1 | * | 9/2008 | Shibata .......................... | 279/82 |
| 2012/0126497 A1 | * | 5/2012 | Lin ............................... | 279/155 |

* cited by examiner

*Primary Examiner* — Eric A Gates
*Assistant Examiner* — Chwen-Wei Su
(74) *Attorney, Agent, or Firm* — Muncy, Geissler, Olds & Lowe, P.C.

(57) ABSTRACT

A tool connecting rod of the present invention includes a barrel and a rod. A resilient unit and a retainer are disposed between the barrel and the rod. Both of an inner wall of the barrel and a body portion of a pushing member are formed with at least two stepped recesses respectively. As such, the structure of the tool connecting rod is simple so that a tool bit assembles on and detaches from the present invention rapidly.

12 Claims, 8 Drawing Sheets

TOOL CONNECTING ROD

BACKGROUND OF THE INVENTION

1. Field of the Invention

The present invention relates to a tool connecting rod, and more particularly to a tool connecting rod which consists of two elements combined together.

2. Description of the Prior Art

A conventional tool connecting rod has many disadvantages as follows:

First of all, the tool connecting rod consists of a barrel, a hexagonal connecting rod, and a slide cover. The slide cover is used for controlling the tool connecting rod to tighten or release a tool bit. The tool connecting rod is three-piece, i.e., it has too many elements so that the price of the tool connecting rod does not have any competitive advantage.

Secondly, the three piece tool connecting rod has too many elements so as to affect its assembling rate and production capacity.

Thirdly, the conventional tool connecting rod has the slide cover, so that it is too wide to go into a narrowing space. Even if the tool connecting rod goes in the narrowing space, an outer surface of the slide cover rubs with objects easily so as not to operate it smoothly.

Fourthly, the conventional tool connecting rod includes a steel ball for tightening the tool bit. The steel ball has an arc surface. A part of the arc surface is in contact with a vertical surface of the tool bit, so that the steel ball is not able to clamp the tool bit well. In other words, the tool bit can not be clamped by the ball stably. It will influence the torque of the connecting rod as users work with it.

The present invention is, therefore, arisen to obviate or at least mitigate the above mentioned disadvantages.

SUMMARY OF THE INVENTION

The main object of the present invention is to provide a two-piece tool connecting rod.

Another object of the present invention is to provide a tool connecting rod, which clamps a tool bit easily, smoothly and fast.

To achieve the above and other objects, a tool connecting rod of the present invention includes barrel, a rod, a resilient unit, and a retainer.

The barrel defines a first receiving space and a second receiving space along an axial hole. The first receiving space defines a guide groove extending toward the second receiving space. The guide groove has an inner wall extending axially. The inner wall is formed with a first stepped portion. The first stepped portion has at least two stepped recesses.

The rod is slidably received in the axial hole of the barrel. The rod comprises a first section and a second section. An end surface of the first section of the rod is formed with a receiving hole axially. An outer surface of the first section of the rod is formed with at least a through hole radially communicating the receiving hole.

The resilient unit comprises a pushing member, a first elastic member and two limiting elements. The pushing member has a body portion and an expanding portion. An outer surface of the body portion has a second stepped portion. The second stepped portion is formed with at least two stepped recesses. The body portion of the pushing member is received and sleeved by the first elastic member, so that the pushing member is slidably received in the receiving hole of the rod. The limiting elements are received in the through hole of the rod. An outer side and an inner side of each limiting element selectively abuts against one of the stepped recesses of the first stepped portions and one of the stepped recesses of the second stepped portions, so that the pushing member is slid and limited.

A front end of the retainer is formed with two clamping portions, the clamping portions are capable of elastically moving inward. The retainer is disposed between the end surface of the first section of the rod and the pushing member, such that the retainer and the rod are in an operative relationship.

As such, the tool connecting rod of the present invention can achieve the advantages mentioned above.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
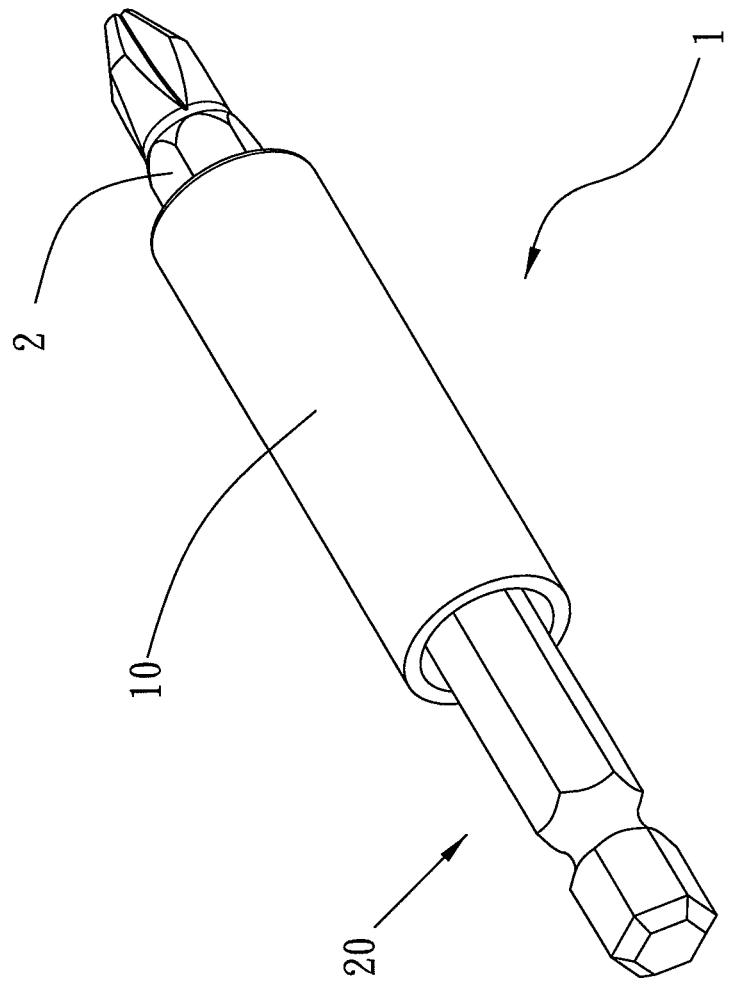
FIG. 1 is a stereogram of the present invention.
Figure 2:
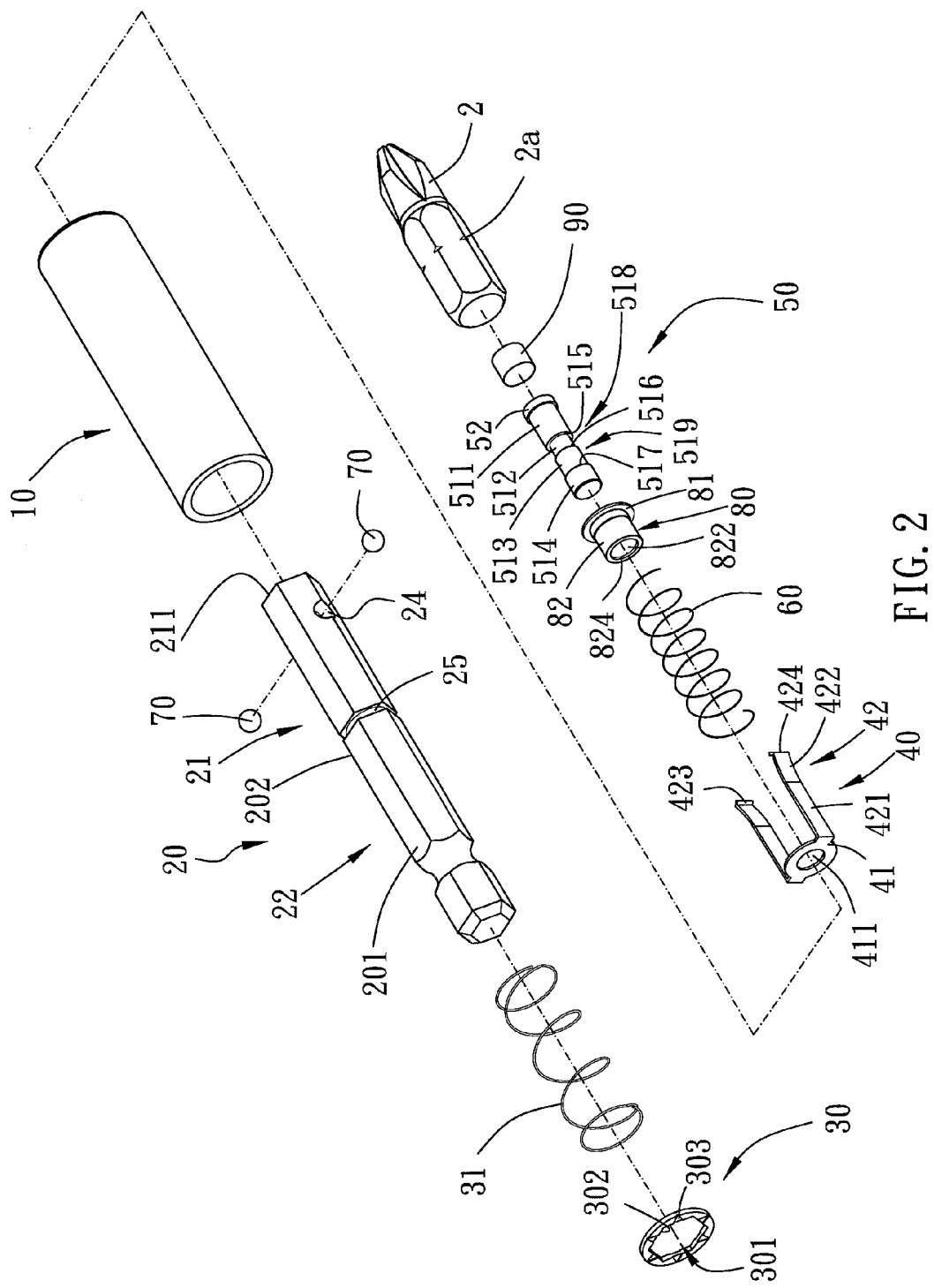
FIG. 2 is a breakdown drawing of the present invention.
Figure 2A:
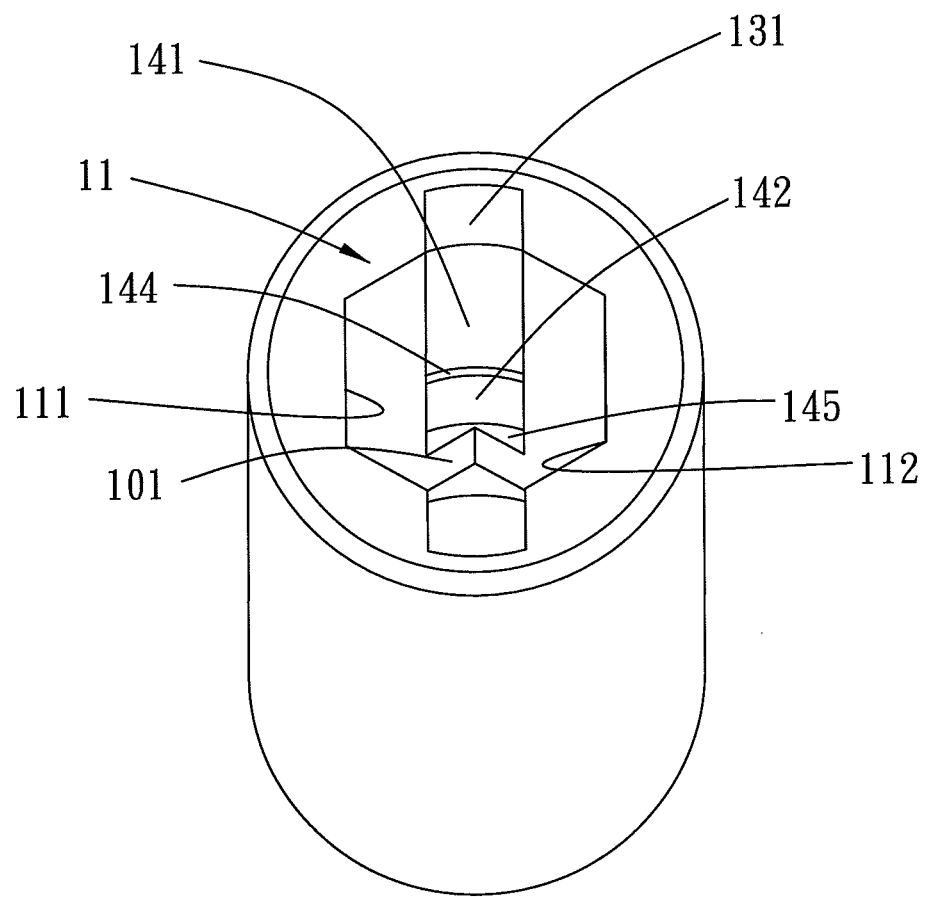
FIG. 2A is a schematic view showing an end surface of a barrel.
Figure 3:
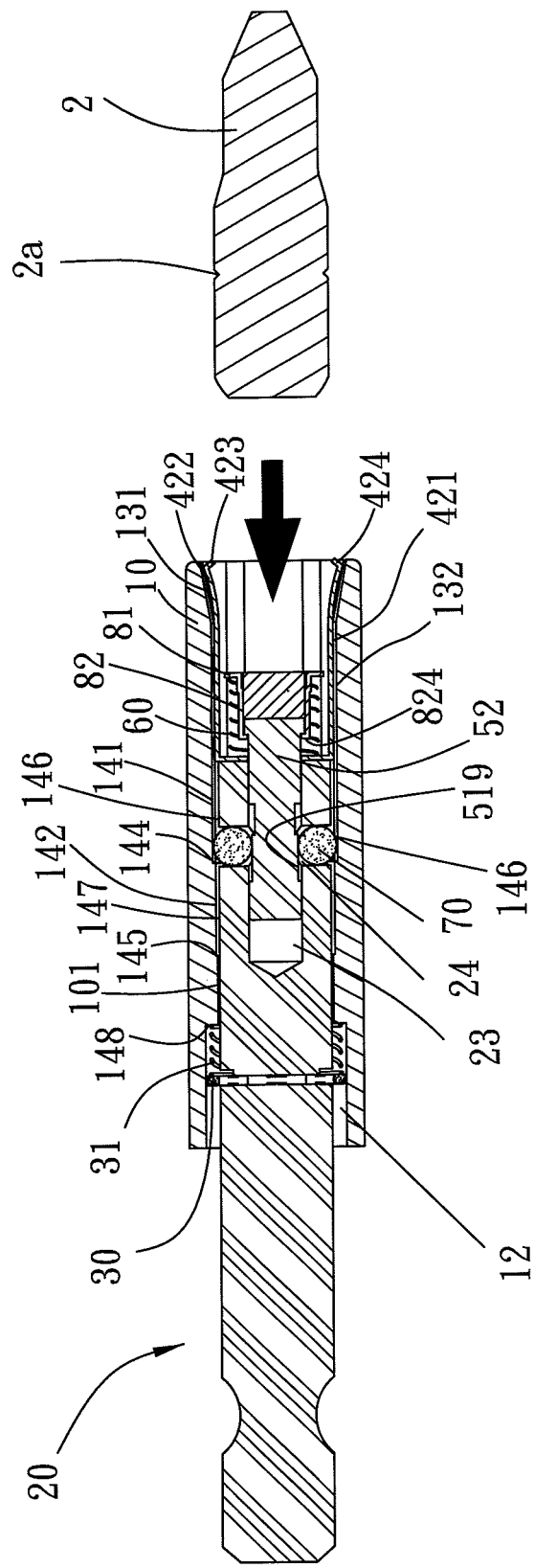
FIG. 3 is a side cross-sectional view of the present invention.

Please refer to FIG. 1 to FIG. 3 for a preferred embodiment of the present invention. The tool connecting rod 1 of the present embodiment includes a barrel 10, a rod 20, a retainer 40 and a resilient unit.

The barrel 10 is a hollow cylinder. The barrel has a first end and a second end. The barrel 10 defines an axial hole penetrating the first and the second ends of the barrel 10 axially. The axial hole defines a first receiving space corresponding to the first end of the barrel 10 and a second receiving space 12 corresponding to the second end of the barrel 10. A bore diameter of the second receiving space 12 is larger than that of the first receiving space. A flange 101 protruding from an inner surface of the axial hole of the barrel 10 is located between the first and the second receiving spaces, and the flange 101 is formed with a hexagonal hole. A maximum bore diameter of the first receiving space is larger than that of the hexagonal hole of the flange 101. The first receiving space further defines an upper receiving space and a lower receiving space. More specifically, a part of the first receiving space defines the upper receiving space, and another part of the first receiving space defines the lower receiving space. The upper receiving space is located near an end opening of the first end of the barrel. The lower receiving space extends to the flange 101. The hexagonal hole of the flange 101 communicates between the lower receiving space and the second receiving space. A part of the inner surface of the axial hole located the first receiving space is formed with a polygonal hole 11. Preferably, the polygonal hole 11 is hexagonal so that a hexagonal tool bit 2 can insert therein. The polygonal hole 11 has six tangent planes 111, and any two of which are formed with a corner 112, i.e., the polygonal hole has six corners 112 totally. Please refer to FIG. 2, the first receiving space defines a guide groove extending toward the second receiving space 12. More clearly, the guide groove is formed and extends along two of the corners 112 of the polygonal hole opposite to each other toward the second receiving space 12. The guide groove comprises an inclined guide section 131 corresponding to the upper receiving space and a straight guide section 132 corresponding to the lower receiving space. The inclined guide section 131 narrows down from the end surface of the first end of the barrel 10 to the straight guide section 132 gradually so that the inclined guide section 131 is trumpet-shaped. The straight guide section has an inner wall extending axially. The inner wall of the straight guide section is formed with a first stepped portion. The first stepped portion of the inner wall of the straight guide section has a first stepped surface 141 and a second stepped surface 142. Diameters of the first and the second stepped surfaces 141 and 142 narrow down toward the second receiving space 12 gradually. In the present embodiment, the diameter of the first stepped surface 141 is larger than that of the second stepped surface 142, so that a first blocking edge 144 is formed between the first and the second stepped surfaces 141 and 142. The diameter of the second surface 142 is lager than that of the flange 101, so that a second blocking edge 145 is formed between the second stepped surface 142 and the flange 101. The first stepped surface 141 and the first blocking edge 144 define a first stepped recess 146. The second stepped surface 142 and the second blocking edge 145 define a second stepped recess 147. A third blocking edge 148 is formed between the flange 101 and the second receiving space 12.

Figure 3A:
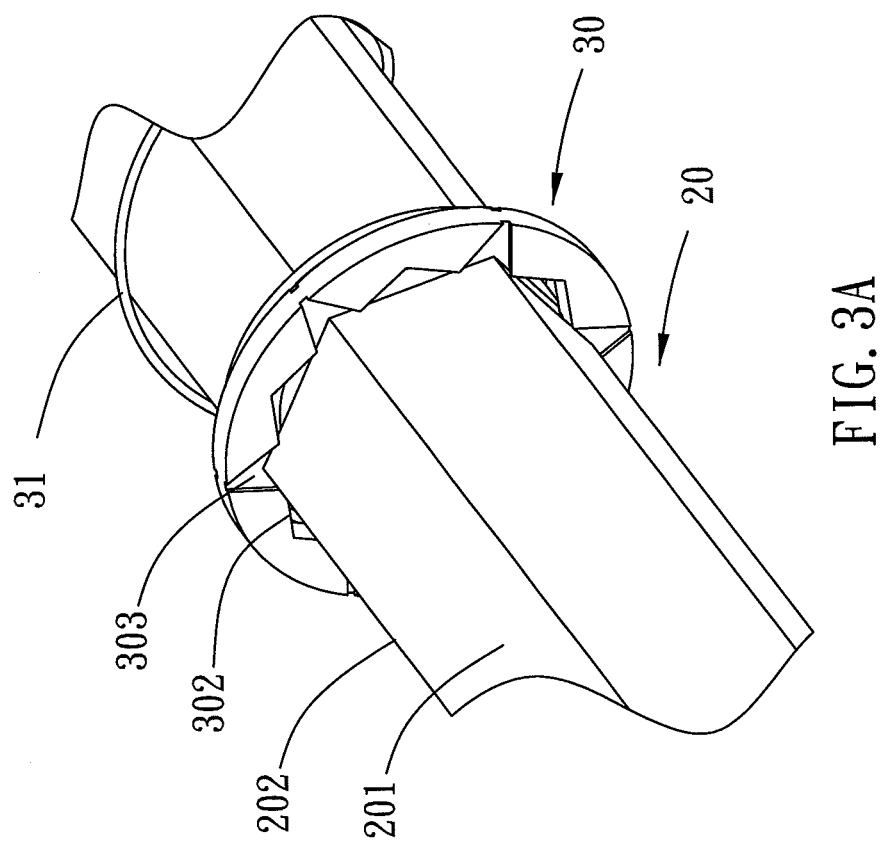
FIG. 3A is a partial enlargement view showing a limited member is disposed on and abuts against a rod.

The rod 20 consists of a plurality of tangent planes and a plurality of corners. Each corner is formed between any two of tangent planes which are adjacent to each other, so that the rod is polygonal. In the present invention, the rod consists of six tangent planes and six corners, i.e., it is a hexagonal rod. The rod 20 is slidably received in the axial hole of the barrel 10. The rod comprises a first section and a second section 21 and 22. An end surface 211 of the first section 21 of the rod is formed with a receiving hole 23 axially. An outer surface of the first section of the rod is formed with two through holes 24 radially communicating the receiving hole 23 respectively. More definitely, the through holes are located at two of the corners of the rod, which are diagonal. An annular groove 25 is caved in an outer surface of the rod 20 between the first and the second sections 21 and 22. The rod 20 is slidably combined with the barrel 10 by a second elastic member 31 and a fixed member 30. The rod 20 is received and sleeved by the second elastic member 31. The fixed member 30 is disposed in the annular groove 25. Two ends of the second elastic member 30 respectively abut against the fixed member 30 and the third blocking edge 148. In other words, the second elastic member 30 is located between the fixed member 30 and the third blocking edge 148. The fixed member 30 is formed with a polygonal aperture 301 corresponding to the hexagonal rod. The polygonal aperture 301 has six tangent planes 302, that is, the number of the tangent planes 302 of the polygonal aperture 301 corresponds to the number of tangent planes 201 of the hexagonal rod 20. Each of tangent planes 302 has a central section. The fixed member 30 has two end surfaces opposite to each other. At least one end surface of the fixed member 30 is formed with a plurality of concave surfaces 303 corresponding to the central sections of the tangent planes 302 respectively. In this embodiment, each of the end surfaces of the fixed member 30 is formed with six concave surfaces 303 corresponding to the central sections of the tangent planes 302 respectively. In other words, two sides of each central section has two concave surfaces 303 respectively, and these two concave surfaces 303 are opposite to each other. In another embodiment, only one end surface of the fixed member 30 is formed with six concave surfaces 303. The concave surfaces 303 are triangle. When the fixed member is assembling in the annular groove 25, the tangent planes 302 of fixed member 30 aim at and move along the tangent planes 201 of rod 20 into the annular groove 25. Thereafter, rather turn the fixed member 30 until the concave surfaces 303 of the central sections of the tangent planes correspond to the corners 202 of the rod 20. As shown in FIG. 3A, two sides of the concave surfaces 303 mate with the corners 202 of the rod 20 as the fixed member 30 is pushed by an elasticity of the second elastic member 31. As such, the fixed member is disposed in the annular groove 25 tightly and is not turned around the rod 20 at all.

The retainer 40 is disposed between the end surface 211 of the first section of the rod and a pushing member 50 such that the retainer 40 and the rod 20 are in an operative relationship. In other words, the rod 20 can drive the retainer 40 to slide along the guide groove. The retainer 40 has an abutting surface 41 and two clamping arms 42 extending from two sides of the abutting surface 41 symmetrically. The clamping arms 42 are slidably limitedly disposed in the guide groove. The abutting surface 41 is formed with a penetrating hole 411. Each of the clamping arms 42 comprises a straight section 421 connecting to the abutting surface 41 and an inclined section 422 extending from the straight section 421 outwardly and inclinedly. The straight section 421 is slidably disposed in the straight guide section of the guide groove. The inclined section 422 is slidably disposed in the inclined guide section of the guide groove. Each of the inclined section 422 is formed with an clamping portion 423. The clamping portions 423 are curved inward and are hook in shape. A distal end of each clamping portion 423 is formed with a protruding portion 424 thereat. A distance between the protruding portions 424 of the clamping arms is not smaller than a diameter of the lower receiving space. Normally, a maximum diameter of an opening formed between the clamping portions of the clamping arms is not smaller than a diameter of the tool bit.

The resilient unit comprises the pushing member 50. The pushing member 50 is a cylinder and has a body portion and an expanding portion 52. An outer diameter of the expanding portion 52 is larger than that of the body portion. The body portion penetrates through the penetrating hole 411 of the retainer and is received in the receiving hole 23 of the rod. An outer surface of the body portion has a second stepped portion. The second stepped portion is formed with a fourth stepped surface 511, a fifth stepped surface 512, a sixth stepped surface 513, and a seventh stepped surface 514 in order from the expanding portion 50 to an end of the body portion where is away from the expanding portion 50. A fourth blocking edge 515 is formed between the fourth and the fifth stepped surfaces. A fifth blocking edge 516 is formed between the fifth and the sixth stepped surfaces. A sixth stepped surface 517 is formed between the sixth and the seventh stepped surfaces. The fifth stepped surface 512 is formed with a third stepped recess 518. The sixth stepped surface 513 is formed with a fourth stepped recess 519.

The resilient unit further comprises a first elastic member 60. The first elastic member 60 is disposed on the body portion of the pushing member 50. On the other hand, the body portion of the pushing member 50 is received and sleeved by the first elastic member 60 directly. The pushing member can move toward the first end of the barrel by an elasticity of the first elastic member 60 at any time.

The resilient unit further comprises two limiting elements 70. In this embodiment, the limiting elements 70 are steel balls. The limiting elements are received in the through holes 24 of the rod respectively. An inner side of each limiting element 70 selectively abuts against the third or the fourth stepped recesses of the pushing member 50. An outer side of each limiting element 70 selectively abuts against the first or the second stepped recesses of the guide groove.

The body portion of the pushing member 50 is received and sleeved by the first elastic member 60 first, Thereafter, the body portion penetrates through the penetrating hole 411 of the retainer. Finally, the pushing member 50 is slidably received in the receiving hole 23 of the rod. At this time, the limiting elements 70 selectively abuts against one of the stepped recesses of the first stepped portions and one of the stepped recesses of the second stepped portions, so that the pushing member 50 do not leave from the receiving hole 23.

Preferably, the resilient unit further comprises a sleeve 80 and a magnetic member 90. The sleeve 80 has a blocking portion 81 and a receiving portion 82 extending and narrowing from one end of the blocking portion 81. The receiving portion 82 defines a receiving space. A part of a bottom surface of the receiving portion 82 is formed with a through bore 822, another part of the bottom surface 82 is formed with a keeping section 824. In other words, if the resilient unit includes the sleeve 80 and the magnetic member 90, it is the best embodiment of the present invention actually. The first elastic member 60 receives and sleeves on the receiving portion 82, so that one end of the first elastic member 60 abuts against the abutting surface 41 of the retainer, the other end of the first elastic member 60 abuts against the blocking portion 81 of the sleeve. The body portion of the pushing member penetrates the through bore 822 of the sleeve, the first elastic member 60, and the penetrating hole 411 of the retainer at first. The expanding portion 52 of the pushing member abuts against the keeping section 824 around the through bore 822. Finally, the body portion of the pushing member 50 is slidably received in the receiving hole 23 of the rod, and abutted and limited by the limiting elements 70. The magnetic member 90 is received in the receiving space of the sleeve 80 and aligns with an end surface of the blocking portion 81. As such, the magnetic member 90 is able to draw a tool bit 2 and prevent the tool bit 2 from falling down.

Figure 4:
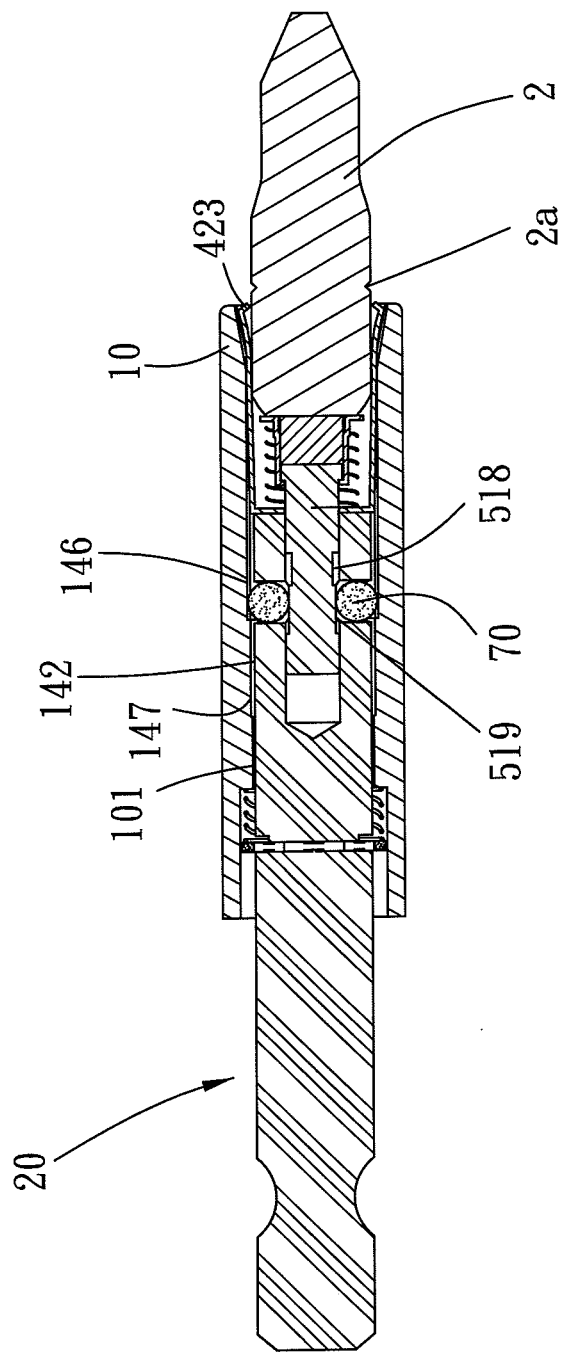
FIG. 4 is a side cross-sectional view showing a tool bit being inserting into the present invention.

Please refer to FIG. 3 and FIG. 4. Before a tool bit inserts into the present invention, the first elastic member 60 pushes the pushing member 50 so that the inner side and the outer side of the limiting element 70 abuts against the first stepped recess 146 and the fourth stepped recess 519 respectively. The inclined section 422 of the retainer is located in the inclined guide section 131 of the guide groove. At this time, the maximum diameter of the opening formed between clamping portions 423 of the retainer is larger than that of the tool bit 2 so that the tool bit 2 inserts into and takes out from the present invention conveniently.

Figure 5:
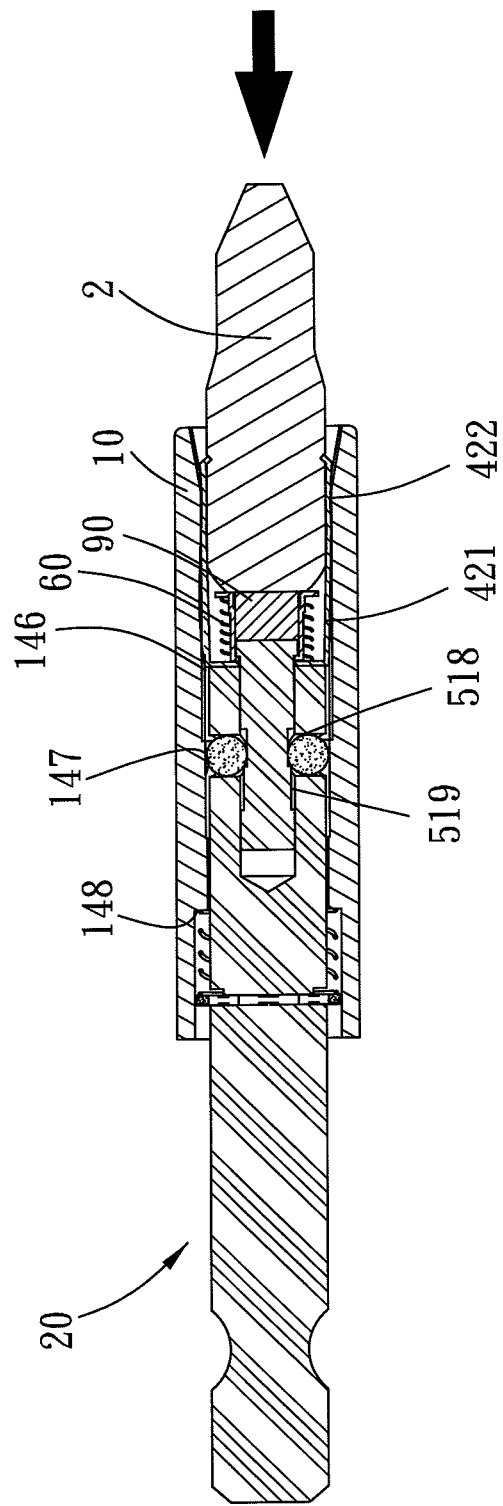
FIG. 5 is a side cross-sectional view showing a tool bit received in and clamped by the present invention.

Please refer to FIG. 5. Inserting the tool bit 2 into the present invention. Thereafter, the tool bit 2 presses the first elastic member 60 so that the first elastic member is compressed and the limiting elements 70 move from the fourth stepped recess 519 to the third stepped recess 518, whose diameter is smaller than a diameter of the fourth stepped recess 519. Eventually the tool bit pushes the rod to move toward the second end of the barrel, so that the limiting element 70 moves from outside of the first stepped recess to the second stepped recess 147. In other words, when the rod 20 is pushed and moves backward by the tool bit as the tool bit insert into the present invention, the retainer 40 moves toward the second receiving space simultaneously, so that the inclined section 422 of the retainer moves from the inclined guide section 131 to the straight guide section 132 and the clamping arms of the retainer move inward because a diameter of the straight guide section 132 is rather smaller than or equal to that of the protruding portion 424 of the inclined guide section 131. The clamping portions 423 of the clamping arms hook in a positioning groove 2a of the tool bit so that the tool bit is firmly and fast combined with the tool connecting rod of present invention.

Figure 6:
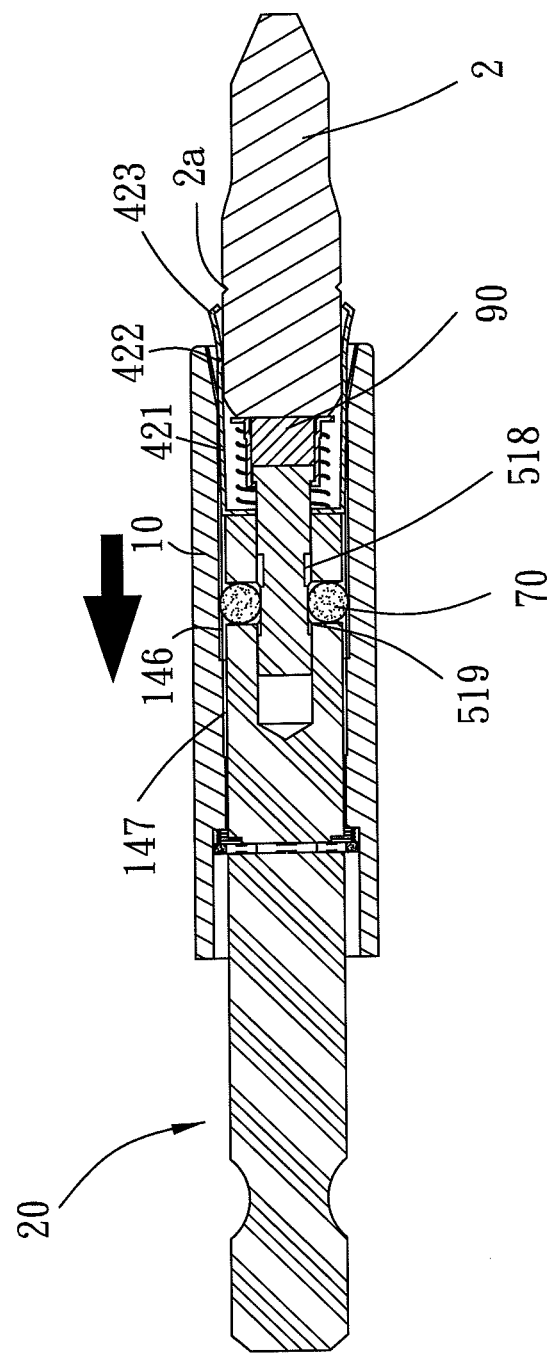
FIG. 6 is a side cross-sectional view showing a tool bit separating from the present invention.

When users would like to take the tool bit 2 out from the present invention, as shown in FIG. 6, they can hold the barrel 10 by one hand and hold the rod 20 by the other hand. Thereafter slide the barrel toward the second end of the rod. At this time, the inner side and the outer side of the limiting elements 70 move from the third stepped recess and the second stepped recess to the fourth stepped recess and the first stepped recess respectively. When the clamping portions 423 slide from the straight guide section 132 to the inclined guide section 131 whose diameter is larger than the diameter of the straight guide section, the clamping portions 423 would recover their shape to the original status and the tool bit 2 is not clamped by the retainer. At the moment, the tool bit is ejecting from the present invention by the elasticity of the first elastic member 60 as a part of the first elastic member 60 is compressed between the keeping section 824 of the retainer 40 and the sleeve 80. Nevertheless, the tool bit 2 is still restricted by the magnetic member 90 so as to fall from the present invention.

Accordingly, the tool connecting rod of the present invention includes some advantages as follows:

First of all, the first and the second stepped recesses are formed on the inner wall of the guide groove of the barrel and the third. The fourth stepped recesses are formed on the body portion of the pushing member. The features mentioned above combine the limiting element for abutting and the retainer whose structure is very special, so that the present invention can assemble to a two-piece tool connecting rod. The structure of two-piece tool connecting rod of the present invention is simple and has the same effect of the conventional tool connecting rod. Furthermore, the two-piece tool connecting rod can reduce the production costs and enhance the market competitiveness of the product. Additionally, the present invention leaves out the slide cover of the conventional tool connecting rod, so that the assembling rate of the present invention is arisen.

Secondly, the present invention leaves out the slide cover of the conventional tool connecting rod so that the present invention is thinner than the conventional tool connecting rod. Whereby the present invention can work at a narrow working environment well.

Thirdly, the elastic clamping arms, the straight and the inclined sections of the retainer correspond to the straight and the inclined guide section of the guide groove. When the retainer move with the rod together, the clamping arms are compressed by the straight guide section automatically. The hook-shaped clamping arms clamp to the positioning groove of the tool bit. When the inclined sections move back to the inclined guide section, the clamping arms recover their shape into original status and separate from the positioning groove of the tool bit so that the tool bit is not clamped by the retainer. As such, the tool bit can be clamped and released from the present invention easily as the present invention includes the features mentioned above.

Fourthly, the hook-shaped clamping portion of the retainer can clamp the tool bit more tightly so that users can operate the tool bit easily and the tool bit can elaborate larger torque for work.

Fifth, after the fixed member installs on the rod, it turns around the rod. Thereafter, the concave surfaces of the tangent surfaces of the polygonal aperture of the fixed member mate with the corners of the rod. As such the present invention can provide the second elastic member to abut against the fixed member and the third blocking edge stably, to reinforce the fixed member to combine with the rod tightly.

What is claimed is:

1. A tool connecting rod, comprising:
   a barrel, having a first end and a second end, the barrel defining an axial hole penetrating the first and the second ends of the barrel axially, the axial hole defining a first receiving space corresponding to the first end of the barrel and a second receiving space corresponding to the second end of the barrel, the first receiving space defining a guide groove extending toward the second receiving space, the guide groove having an inner wall extending axially, the inner wall being formed with a first stepped portion, the first stepped portion having at least two stepped recesses;
   a rod, slidably received in the axial hole of the barrel, the rod comprising a first section and a second section, an end surface of the first section of the rod being formed with a receiving hole axially, an outer surface of the first section of the rod being formed with at least a through hole radially communicating the receiving hole,
   a resilient unit, comprising at least a pushing member and at least a limiting element, the pushing member having a body portion, an outer surface of the body portion having a second stepped portion, the second stepped portion being formed with at least two stepped recesses, the pushing member being slidably received in the receiving hole of the rod, the limiting element being received in the through hole of the rod, an outer side and an inner side of the limiting element selectively abutting against one of the stepped recesses of the first stepped portions and one of the stepped recesses of the second stepped portions, so that the pushing member is slid and limited;
   and a retainer, limitedly slid along the guide groove, a front end of the retainer being formed with two clamping portions, the clamping portions being capable of elastically moving inward, the retainer being disposed between the end surface of the first section of the rod and the pushing member, such that the retainer and the rod are in an operative relationship.

2. The tool connecting rod of claim 1, wherein the pushing member has an expanding portion, an outer diameter of the expanding portion is larger than that of the body portion, the retainer has an abutting surface and two clamping arms extending from two sides of the abutting surface symmetrically, the clamping arms are slidably disposed in the guide groove, the resilient unit further comprises a first elastic member, the first elastic member is disposed on the body portion of the pushing member, the abutting surface of the retainer abuts against the end surface of the first section of the rod and is formed with a penetrating hole, the penetrating hole is used for the body portion of the pushing member penetrating therethrough, each of the clamping arms comprises a straight section connecting to the abutting surface and an inclined section extending from the straight section outwardly and inclinedly, each of the inclined section is formed with the clamping portion, the clamping portions are curved inward and are hook in shape, a distal end of each clamping portion is formed with a protruding portion thereat.

3. The tool connecting rod of claim 2, wherein a flange protruding from an inner surface of the axial hole of the barrel is located between the first and the second receiving space, the flange is formed with a hexagonal hole, a part of the first receiving space adjacent to the first end of the barrel defines an upper receiving space, another part of the first receiving space adjacent to the second receiving space defines a lower receiving space, a part of the inner surface of the axial hole located the first receiving space is formed with a polygonal hole, the polygonal has a plurality of tangent planes, any two of which are formed with a corner, the guide groove is formed and extends along two of the corners of the polygonal hole opposite to each other.

4. The tool connecting rod of claim 3, wherein the guide groove comprises a inclined guide section corresponding to the upper receiving space and a straight guide section corresponding to the lower receiving space, an inner wall of the straight guide section of the guide groove is formed with a first stepped surface and a second stepped surface, diameters of the first and the second stepped surfaces narrow down toward the second receiving space gradually, so that a first blocking edge is formed between the first and the second stepped surfaces, a second blocking edge is formed between the second stepped surface and the flange, the first stepped surface and the first blocking edge define a first stepped recess, the second stepped surface and the second blocking edge define a second stepped recess, a third blocking edge is formed between the flange and the second receiving space, a bore diameter of the second receiving space is larger than that of the first receiving space, a maximum bore diameter of the first receiving space is larger than that of the hexagonal hole of the flange.

5. The tool connecting rod of claim 4, wherein the resilient unit further comprises a sleeve, a first elastic member, and a magnetic member, the sleeve has a blocking portion and a receiving portion extending and narrowing from one end of the blocking portion, the receiving portion is received and sleeved by the first elastic member, the receiving portion defines a receiving space for receiving the magnetic member therein, a part of a bottom surface of the receiving portion is formed with a through bore, another part of the bottom surface is formed with a keeping section, the body portion of the pushing member penetrates the through bore of the sleeve and the first elastic member, the expanding portion of the pushing member abuts against the keeping section, so that one end of the first elastic member abuts against the abutting surface of the retainer, the other end of the first elastic member abuts against the blocking portion of the sleeve.

6. The tool connecting rod of claim 2, wherein the body portion of the pushing member is formed with a fourth stepped surface, a fifth stepped surface, a sixth stepped surface, and a seventh stepped surface in order from the expanding portion to an end of the body portion where is away from the expanding portion, a fourth blocking edge is formed between the fourth and the fifth stepped surfaces, a fifth blocking edge is formed between the fifth and the sixth stepped surfaces, a sixth stepped surface is formed between the sixth and the seventh stepped surfaces, the fifth stepped surface is formed with a third stepped recess, the sixth stepped surface is formed with a fourth stepped recess.

7. The tool connecting rod of claim 2, wherein the rod consists of a plurality of tangent planes and a plurality of corners, each corner is formed between any two of tangent planes which are adjacent to each other, so that the rod is polygonal, an annular groove is caved in an outer surface of the polygonal rod between the first and the second sections, the rod is slidably combined with the barrel by a second elastic member and a fixed member, the second elastic is adapted for the rod penetrating therethrough, the fixed member is disposed in the annular groove, two ends of the second elastic member respectively abut against the fixed member and the second receiving space, the through hole is formed at one of the corners of the rod.

8. The tool connecting rod of claim 7, wherein the fixed member is formed with a polygonal aperture, the polygonal aperture has a plurality of tangent planes, each of tangent planes has a central section, the fixed member has two end surfaces opposite to each other, at least one end surface of the fixed member is formed with a plurality of concave surfaces corresponding to the central sections of the tangent planes respectively.

9. The tool connecting rod of claim 1, wherein a flange protruding from an inner surface of the axial hole of the barrel is located between the first and the second receiving spaces, the flange is formed with a hexagonal hole, a part of the first receiving space adjacent to the first end of the barrel defines an upper receiving space, another part of the first receiving space adjacent to the second receiving space defines a lower receiving space, a part of the inner surface of the axial hole located the first receiving space is formed with a polygonal hole, the polygonal hole has a plurality of tangent planes, any two of which are formed with a corner, the guide groove is formed and extends along two of the corners of the polygonal hole opposite to each other.

10. The tool connecting rod of claim 1, wherein the rod consists of a plurality of tangent planes and a plurality of corners, each corner is formed between any two of tangent planes which are adjacent to each other, so that the rod is polygonal, an annular groove is caved in an outer surface of the polygonal rod between the first and the second sections, the rod is slidably combined with the barrel by a second elastic member and a fixed member, the rod is received and sleeved by the second elastic member, the fixed member is disposed in the annular groove, two ends of the second elastic member respectively abut against the fixed member and the second receiving space, the through hole is formed at one of the corners of the rod.

11. The tool connecting rod of claim 10, wherein the fixed member is formed with a polygonal aperture, the polygonal aperture has a plurality of tangent planes, each of tangent planes has a central section, the fixed member has two end surfaces opposite to each other, at least one end surface of the fixed member is formed with a plurality of concave surfaces corresponding to the central sections of the tangent planes respectively.

12. The tool connecting rod of claim 1, wherein the pushing member has an expanding portion, an outer diameter of the expanding portion is larger than that of the body portion, the resilient unit further comprises a sleeve, a first elastic member, and a magnetic member, the sleeve has a blocking portion and a receiving portion extending and narrowing from one end of the blocking portion, the receiving portion defines a receiving space for receiving the magnetic member therein, a part of the bottom surface of the receiving portion is formed with a through bore, another part of the bottom surface is formed with a keeping section, the body portion of the pushing member penetrates the through bore of the sleeve, the expanding portion of the pushing member abuts against the keeping section, the first elastic member is adapted for the receiving portion of the sleeve penetrating therethrough, so that one end of the first elastic member abuts against the abutting surface of the retainer, the other end of the first elastic member abuts against the blocking portion of the sleeve.

* * * * *